United States Patent Office 3,275,479
Patented Sept. 27, 1966

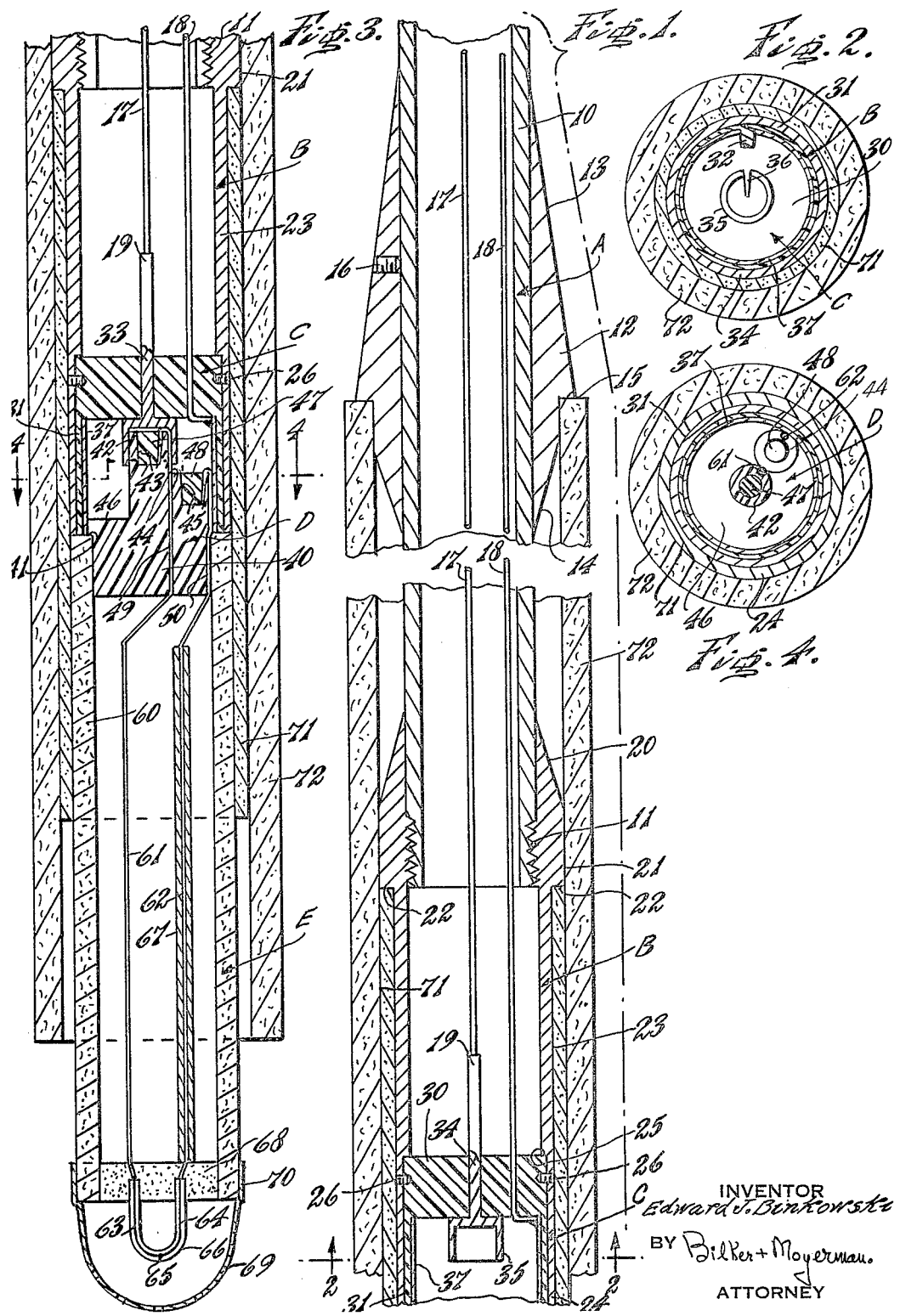

3,275,479
PYROMETRIC LANCE APPARATUS
Edward J. Binkowski, Philadelphia, Pa., assignor to Pyrotemp Corporation, Philadelphia, Pa., a corporation of Pennsylvania
Filed Jan. 15, 1963, Ser. No. 251,562
6 Claims. (Cl. 136—233)

This invention relates broadly to immersion pyrometers of the type including a manipulator section and an expendable, plug-in temperature-sensing section. The totality of the assemblage is often referred to as a pyrometric lance. More particularly, it relates to an improved expendable plug-in temperature section and to improvements in members associated therewith.

Immersion pyrometer systems utilizing expendable sensing units, such as expendable thermocouple units, where the units are to be used only once and then discarded, are disclosed in United States Letters Patent Nos. 2,993,944, 2,999,121, 3,011,005, 3,024,295, 3,038,951 and 3,048,642. The use of expendable temperature-sensing units such as these has become increasingly important, particularly in the manufacture of iron and steel where the temperature of the molten metal bath is detected by immersing the measuring or hot junction of a thermocouple device in the bath of molten metal and allowing it to remain until the thermocouple reaches the temperature of the bath. It is preferable to use an expendable thermocouple because of the fact that high temperatures and the nature of the molten metal bath produce changes in calibration of a thermocouple due to contamination. Consequently, if used more than once and not frequently checked for accuracy, measurements may be accepted that are seriously inaccurate. Such inaccuracies are eliminated by using expendable, low-cost, prefabricated units which may be easily and rapidly connected for use, a new one for each measurement, and which, after immersion in the bath of molten metal and the taking of the measurement, are discarded.

Expendable units must be securely connected both mechanically and electrically, to a holder or manipulator. The problem of properly effecting such connection is a difficult one due to the adverse conditions met in molten metal pyrometry.

When the sensing element is a thermocouple, it is necessary to provide the manipulator and expendable plug-in temperature sensing unit with polarized mating means which will withstand high temperatures and still provide electrical contact. With the wide acceptance of these expendable units there has arisen a natural desire on the part of users to effect economies. Many of the prior art devices including those shown or disclosed by the above patents are relatively expensive. In fact, various components and materials used therein are of such high quality construction and complicated design as to be worthy of units which are intended for more than a single utilization. On the other hand, attempts to turn out less expensive units have resulted in expendable temperature sensing devices which do not have the required degree of ruggedness or reliability.

It is common in the production of these units to test them by actually plugging them into a test contact block and, after testing, removing them for packaging and shipment. In the course of such testing inexpensive units of the prior art have failed due to the displacement of lead wires with respect to certain of the plug elements. Further, inexpensive units which omitted many of the insulating block portions of the prior art have been unable to withstand the rigors of shipment and have arrived at the user's establishment unfit for their intended purpose.

Accordingly, it is an object of this invention to provide an extremely inexpensive temperature sensing unit which is nonetheless rugged and capable of rough handling.

Another object of the invention is to provide novel means for securing delicate lead wires at predetermined locations on and about the plug portion of a plug-in temperature sensing unit and retain them against displacement forces.

Still a further object of the invention is to provide a plug-in temperature sensing unit for immersion pyrometers which will withstand the rigors of shipment without internal damage and without the creation of any internal short-circuits.

Still another object of the invention is to provide a novel contact block and plug arrangement for use in connection with temperature sensing units, said arrangement permitting the ready location of polarized complementary elements while still giving most of the desirable attributes of non-directional contact structures.

A further object of the invention is to provide a jack and plug construction wherein contact occurs between single conductors and metallic split-ring conductors.

Still another object of the invention is to provide a pyrometric lance assembly which utilizes novel means for quick positioning and removal of protective tubes and assemblies including tubes adapted to encapsulate the electrical structure.

It is also an object of the invention to provide a device of the character described which is rugged in construction, easily and inexpensively manufactured, highly reliable and efficient in use and an improvement over the prior art.

These and other related objects will be apparent to those skilled in the art from a consideration of the description which follows. The various features and details of construction of the invention are more fully set forth herein with reference to the accompanying drawing in which:

FIGURE 1 represents a fragmentary sectional elevation of a pyrometric lance assembly embodying the invention.

FIGURE 2 represents a section taken on line 2—2 of FIGURE 1.

FIGURE 3 represents a fragmentary sectional elevation of the pyrometric lance assembly of FIGURE 1, particularly showing the portion including an expendable plug-in temperature sensing unit of the invention.

FIGURE 4 is a section taken along line 4—4 of FIGURE 3.

Referring now to the drawings, wherein like reference numerals designate like parts, it will be observed that the pyrometric lance assembly comprises a manipulator A on which is mounted a contact block holder B containing a contact block C. Mating with the block C and complementary therewith is a plug D which forms an integral part of the expendable plug-in temperature-sensing unit E.

Manipulator A comprises several pieces of pipe 10 which may be of any suitable diameter and weight such as, for instance, one inch Schedule 40, and which may be of any desired length generally on the order of magnitude of eight feet. The manipulator is customarily made up of a plurality of pipe lengths 10 coupled together conventionally with suitable couplings. The end of the manipulator proximal the contact block holder B may be provided with external threads as at 11. The distal end of the manipulator, not shown, is adapted to be held by the operator and may be provided with the usual handle. Intermediate the proximal and distal ends of manipulator A is mounted a tube stop 12, as shown in FIGURE 1. This stop is preferably provided with a distal taper 13 and a proximal tube guiding taper 14 and is shouldered, as at 15, for a purpose which will be explained below. The tube stop 12 may be positioned as desired along the length of manipulator A (e.g. as a function of the length of the tube) and secured thereto, for instance, by the use of set screw 16. As shown, the internal diameter of tube stop 12 approximates the outside diameter of pipe 10.

Within the hollow interior of manipulator A are leads or wires 17 and 18 for connection to a temperature measuring system. Such systems are well known in the art, and it is not believed necessary to illustrate or describe them here. The wires 17 and 18 are encased in suitable insulation 19, such as rubber or plastic, and extend from the contact block C to the measuring instrument. They leave manipulator A at its distal end through a T or similar fitting. The electrical measuring instrument, the wires 17 and 18 as well as suitable means for connecting these wires, via the manipulator section, A to the instrument are conventional and form no part of the instant invention.

To the manipulator section A is attached, as by threaded portion 11, a contact block holder B. As best shown in FIGURE 1, the holder B is provided with a distal tapered tube guiding surface 20 a cylindrical portion 21 of a first diameter, a shoulder or offset 22 and a proximal cylindrical portion 23 of a diameter less than that of cylindrical portion 21. Portion 23 is further increased in internal diameter as at 24, while maintaining a constant outside diameter, and thus an internal shoulder 25 is created. The contact block holder B may be conveniently provided with a plurality of set screws 26 or other retention devices. It may be made of any high-strength, heat-resistant, dimensionally stable material. Metals are customarily used, however, high-strength plastics which meet the previously stated requirements are also suitable.

Lead wires 17 and 18, which are contained in the hollow interior of manipulator A, terminate in and are electrically and mechanically secured to contact block C. As shown in FIGURES 1 and 3, this block is mounted within and retained by contact block holder B. The block comprises a generally cylindrical base section 30, the outside diameter of which complements the internal diameter of contact block holder portion 24. The base abuts internal shoulder 25 and is longitudinally retained by set screws 26. Integral with the base is annular portion 31 which extends longitudinally toward the proximal end of the lance assembly. As shown best in FIGURE 2, annular portion 31 includes an integral stop 32 which extends radially toward the center of the block and occupies an arc of several degrees in cross section. The entire contact block may be molded of a suitable plastic and it is preferred to use materials such as high density polyethylene, hard synthetic rubbers or other strong but somewhat yieldable materials. Co-axially mounted in block C is a split-ring electrically conductive metallic jack generally designated 33, which includes a small diameter hollow distal portion 34 and an integral proximal split-ring portion 35 which further includes a mechanical and electrical gap 36. Jack 33 may be press-fitted into and through base portion 30 and retained thereby due to the yieldable nature of the material from which the base portion is fabricated. Lead 19 is permanently connected to and in electrical contact with distal portion 34 and may be secured in the hollow interior thereof by crimping, soldering or any other conventional attachment means. Rotation of jack 33 with respect to base 30 may be prevented by cementing the underside of ring 35 to the face of base 30 or by providing it with mechanical detents such as integral spikes. Press-fitted into the interior of annular portion 31 is another conductive split-ring 37 to which lead wire 18 is attached in any suitable manner as by soldering. As shown in FIGURE 1, lead wire 18 may be brought through base 30 by the provision of a suitable orifice. The gap or split in ring 37 preferably has the same arcuate span as the arcuate span of stop 32 and, as shown in FIGURE 2, ring 37 is mounted so that the gap spans the stop 32. Further, gap 36 in ring 35 is in radial alignment with stop 32 and in plan view both are present in the same sector. While all of the components which have been described above are replaceable, it is not contemplated that they will have to be frequently replaced. In fact, by comparison with those components which will be described below, they are non-expendable as distinguished from the temperature sensing components which are suitable for but a single use before replacement is required.

All of the components which will be described below are sold as a unit and may be, in their totality, referred to as an expendable plug-in temperature sensing unit. As indicated in the objects of the invention cost is a prime consideration. Yet, although the units must sell for a cheap price to warrant their single use they, nonetheless, must be rugged enough to stand rigors of shipment and must give accurate and satisfactory performance. An important part of the temperature sensing unit is the plug D which is an integral part thereof. The plug D mates with and is complementary to the contact block C.

Plug D may conveniently take the form of a stepped and selectively cored unitary plastic mold made of resilient heat-resistant material. It comprises a body 40, which is circular in cross section and shouldered as at 41. The distal face of the plug which faces toward the contact block C is provided with an upper step 42, having a hollow core 43 associated therewith, an intermediate step 44, having a hollow core 45 associated therewith, and an arcuate lower step 46 which is annular in cross section. Core 43 is provided with a resilient plug 47 and core 45 is provided a similar plug 48. Additionally the body 40 is provided with a first orifice 49 extending lengthwise therethrough and a perimetrical longitudinally extending groove 50 which extends from shoulder 41 to the proximal face of the plug D. The purpose of these various orifices and cores will be apparent in the discussion of the temperature sensing unit E which follows.

The body of the temperature sensing unit E comprises a first tube 60 which is made of fiber board or other like material. Plug D is frictionally fitted and yieldably retained within the upper end of tube 60 and is longitudinally positioned therein by abutment of shoulder 41 against the distal end of the tube. In the interior of the tube are provided a lead wire 61 which is effectively an electrical continuation of wire 19 and a lead wire 62 which is effectively an electrical continuation of wire 18. Wire 61 passes upwardly through orifice 49, is bent over the edge of upper step 42 and down into core 43 where it terminates. It is secured within the core by subsequent press fitting of yieldable plug 47. In a somewhat analogous manner, wire 62 passes through body 40 by being positioned in groove 50 continuing upward along the perimetrical exterior of intermediate step 44 and terminates by being bent downward into core 45. Thereafter, press fitting of yieldable plug 48 into core 45 retains wire 62 in that position. Lead wire 61 comprises an alloy of nickel and copper (98% copper and 2% nickel) and lead wire 62 is made of copper. The choice of materials used for these lead wires is a function of the material which is used in the thermocouple element.

As best seen in FIGURE 3, thermocouple element 63 is a short length of fine platinum wire. Thermocouple element 64 is a companion length of fine wire made from an alloy of platinum plus 10% rhodium. The two thermocouple elements are welded to form a measuring junction 65 and are in turn welded, respectively, to lead wires 61 and 62. The selection of suitable lead wires 61 and 62, with respect to material of construction and diameter as well as the relationship between these parameters and the measuring characteristics and physical requirements of thermocouple elements 63 and 64 are factors well known in the art and discussed in the prior patents cited above (e.g. 2,999,121). The elements 63 and 64 are provided, preferably, with a U-shaped tube or thin-walled sheath of heat refractory material such as silica or quartz. Such materials have the well-known properties of being electrically-insulating as well as heat-transmitting. Mounted coaxially on one of the wires, such as the wire 62, is a protective tube 67 which is made of cellulosic material such as paper and resembles an ordinary drinking straw. This tube prevents mechanical damage during shipment of the unit, and also serves to prevent electrical short circuits. The proximal end of tube 60 is plugged as at 68, with a low-expansion refractory cement such as the refractory aluminum oxide cement available on the market under the name of "Alundum." The plug seals the end of tube 60 and simultaneously positions lead wires 61 and 62 as well as elements 63 and 64 against subsequent movement. The entire end of the temperature sensing unit is protected and shielded by a foraminous cap 69, shouldered as at 70 to frictionally engage and resiliently grasp the exterior of tube 60.

Coaxially mounted on tube 60 is a first sleeve 71. As shown in FIGURE 3, sleeve 71 extends from a point on tube 60 intermediate plug D and cap 69 upward to abut shoulder 22 of contact block holder B. Consequently this tube serves to limit the longitudinal motion of temperature sensing unit E with respect to contact block holder B. It simultaneously serves as a means of mounting the temperature sensing unit on the contact block and protecting electrical and mechanical components from heat. Sleeve 71 may be cemented or glued to tube 60 or secured in any other suitable manner.

Coaxially mounted on first tube 60, and slideable with respect thereto, is a second tube 72. This second tube, like first sleeve 71 and first tube 60, is made of cellulosic material such as fiber board. It is of a length sufficient to extend from the proximal portion temperature sensing unit E upward to abut shoulder 15 of tube stop 12. It should be noted that the thickness of second tube 72 is such that, at shoulder 15, it protrudes beyond the distal tapered surface 13. Stop 12 is set at a point determined by the length of tube 72. When the temperature unit E is being shipped tube 72 is slid downwardly with respect to first sleeve 71 so that it encapsulates and protects the entire length of the expendable unit. In use, as shown in FIGURE 3, it serves to protect internal components from heat. Tapered surfaces 14 and 20 make it easy to reciprocate the tube on the assembly.

A last step in the manufacture of such expendable units is, customarily, an electrical test which involves plugging the unit into an equivalent of, contact block C. The removal of the unit from the bench test contact block has, in the past, caused displacement of the distal ends of wires 61 and 62. With the above construction, wherein plugs 47 and 48 positively retain these wires in position, such pretesting has no deleterious effect upon quality control. Further, tube 67 protects the lead wires during shipment; cap 69 at all times protects the thermocouple elements and second tube 72 when slid down to its full protective position serves as a protective shipping tube.

The manner of cooperation between the contact block C and the plug D is apparent from a consideration of FIGURE 3. As shown therein, lead 61 emerges from orifice 49 at the top of intermediate step 44, and from thereon, the bare wire is exposed and lies alongside upper step 42. Wire 62 emerges from groove 50 just above shoulder 41 and, thenceforth, is exposed along the exterior of intermediate step 44 until it is bent into core 45. These two wires thus form electrical contacts for connection of the temperature sensing elements 63 and 64 to lead wires 17 and 18. Electrically this connection is made when plug D is inserted into contact block C. At that time, wire 62 makes electrical contact with ring 37 and wire 61 makes contact with ring 35. The construction shown permits contact to be made anywhere through a full arc except for the sector delineated by stop 32 and gap 36, which sector is electrically insulative. The use of split rings has many advantages. First they may be compressed for installation and thereafter expand automatically by their inherent elasticity to give a close friction fit within the contact block. Furthermore, because they are limitedly yieldable they provide a grasping retention for steps 42 and 44. Additionally, the overall construction permits accurate positioning of the plug D in the contact block while at the same time avoiding the difficulties encountered with prior art non-directional structures. Were the contacts non-directional, it would be possible to rotate the temperature sensing unit with respect to the contact block without limit. Such rotation, which often occurs when inept operators attempt to insert non-directional plugs in the prior art blocks, can apply torques to units which may damage them and destroy necessary relationships between their parts.

The instant unit is installed as follows. The second tube 72 is drawn downward from shipping position to expose the distal end of first sleeve 71. This sleeve is fitted over the contact block holder B and serves to axially align sensing unit E with respect to the holder. Even though it is not possible to observe the mating of contact block C with plug D there will be a distinct feel of positive seating when a rotational position is achieved wherein intermediate step 44 does not register with stop 32. Furthermore, because the longitudinal spacing between tube 60 and sleeve 71 is fixed in the course of manufacture, only when proper seating has occurred will the distal end of sleeve 71 abut shoulder 22 on the contact block holder. Once the operator has observed, via this abutment, that the unit has properly seated, he slides second tube 72 toward the tube stop 12 until the distal end of the tube abuts shoulder 15. This seating automatically exposes the temperature-sensing components and makes them ready for immediate use. Seating is positive and external visual indications are provided.

When the lance is inserted into a furnace or body of molten material for making a temperature measurement, the cap 69 prevents mechanical injury to the temperature measuring elements 63 and 64 which might be caused by slag floating on the top of the molten bath. The cap 69 is preferably thin-walled and foraminous so that it will rather quickly melt away after immersion into molten steel but not until the assembly as a whole has been plunged past the layer of slag at the surface of the bath. A suggested material for the cap is perforated 28 gauge mild carbon steel. In use, temperature sensing element E is inserted into a furnace through a suitable opening in the furnace wall and its proximal end is immersed in the molten metal. After the measurement has been made, the novel design of the instant apparatus allows the expendable portion to be electrically disconnected and dropped into the furnace to be consumed. This is accomplished by withdrawing the lance in such a manner that the distal end of second tube 72 (where it projects beyond the apex of tapered surface 13 at shoulder 15) strikes against a portion of the furnace peep hole structure. It is retained thereby as the lance is withdrawn and the expendable unit, the end of which has been fused together or charred so that tube 72 and sleeve 71 are bonded or encrusted with the contents of the furnace, is pulled out of the contact block holder and remains behind in the furnace. The taper 13 automatically serves as a guide for catching the end of tube 71 on the furnace structure and the entire operation can be achieved as one smooth motion occurring during the course of lance withdrawal. For certain application tube 72 may be made of graphite, chemical glass, ceramics or similar materials and may be permanently mounted on the manipulator A, as by threaded attachment to tube stop 12.

It should be understood that the invention is not limited to the specific embodiments shown and that changes and modifications may be made within the scope of the appended claims.

What is claimed is:

1. A pyrometric lance apparatus comprising a manipulator section including a pipe section containing a pair of polarized lead wires extending longitudinally therethrough; an external tube stop sleeve longitudinally positionable along and releasably mounted about said pipe section including an external distal tapered surface and an external proximal tapered surface, the transition between said surfaces defining a first proximal offset adapted to abut the end of a protective tube; a generally tubular longitudinally extending contact block holder, through which said lead wires extend, mounted on the proximal end of said pipe section including an external proximal offset adapted to abut the end of a protective sleeve and an internal proximal shoulder adapted to abut the distal end of a contact block and fix its longitudinal position; a generally cylindrical non-conductive contact block having a solid distal portion and cored proximal portion releasably secured within said holder against its internal proximal shoulder and effectively capping and terminating said manipulator section, said cored proximal portion including an integral inward projecting radial stop and having mounted within it two gapped co-axial split-ring jacks to which said lead wires are connected, said jacks comprising an inner jack mounted about the longitudinal axis of the apparatus in abutment with the solid distal portion of said holder and an outer jack mounted coaxially about said first jack and longitudinally projecting past said inner jack, said outer jack being in juxtaposition to the internal walls of said cored portion, the integral stop of said cored portion extending through the gap of said outer jack to form a mechanical stop in the annulus between said jacks, the gaps in said jacks being in radial alignment; and an expendable plug-in temperature sensing section including a body tube; a stepped contact plug capping the distal end of said body tube including a first central longitudinally distally projecting cored step which is circular in cross section, a first core plug within the core of said first step, a second offset cored step which projects distally less than said first step and is inscribed within the annulus between said first step and the perimeter of said contact plug, a second core plug within the core of said second step and means for conducting lead wires from the interior of said body tube to the feet of said steps; a thermocouple mounted at the proximal end of said body tube; polarized lead wires connecting to said thermocouple and extending through said body tube to said contact plug; each of said wires passing through said contact plug, and longitudinally extending along the side of one of said steps and down into its core wherein it is secured by one of said core plugs, said wires being in transverse radial alignment; a tubular shield within said body tube encompassing one of said lead wires; means for protecting said junction; a protective sleeve mounted on the distal end of said body tube and projecting beyond said contact plug; and a protective tube telescopically mounted on said protective sleeve; when said sensing section is mounted on said manipulator section, each of said steps is within said jacks making linear point contact therewith, the distal end of said protective sleeve abuts the proximal offset of said contact block holder and said protective tube can be slid into abutment with said offset on said tube stop sleeve to expose said thermocouple.

2. An expendable plug-in temperature sensing unit for use in a pyrometric lance apparatus comprising a body tube; a stepped contact plug capping the distal end of said body tube including a first central longitudinally distally projecting cored step which is circular in cross section, a first core plug within the core of said first step, a second offset cored step which projects distally less than said first step and is inscribed within the annulus between said first step and the perimeter of said contact plug, a second core plug within the core of said second step and means for conducting lead wires from the interior of said body tube to the feet of said steps; a thermocouple mounted at the proximal end of said body tube; polarized lead wires connecting to said thermocouple and extending through said body tube to said contact plug; each of said wires passing through said contact plug, longitudinally extending along the side of one of said steps and down into its core wherein it is secured by one of said core plugs, said wires being in transverse radial alignment; a tubular shield within said body tube encompassing one of said lead wires; refractory means for protecting said junction; a protective sleeve fixedly mounted on the distal end of said body tube and projecting beyond said contact plug; and a protective tube telescopically mounted on said protective sleeve.

3. A pyrometric lance apparatus comprising a manipulator section including a pipe section containing a pair of polarized lead wires extending longitudinally therethrough; an external tube stop sleeve longitudinally positionable along and releasably mounted about said pipe section including an external distal tapered surface and an external proximal tapered surface, the transition between sand surfaces defining a first proximal offset adapted to abut the end of a protective tube; a generally tubular longitudinally extending contact block holder, through which said lead wires extend, mounted on the proximal end of said pipe section, including an external proximal offset adapted to abut the end of protective sleeve and an internal proximal shoulder adapted to abut the distal end of a contact block and fix its longitudinal position; a generally cylindrical non-conductive contact block having a solid distal portion and a cored proximal portion releasably secured within said holder against its internal proximal shoulder and effectively capping and terminating said manipulator section, said cored proximal portion including an integral inward projecting radial stop and having mounted within it two gapped co-axial split-ring jacks to which said lead wires are connected, said jacks comprising an inner jack mounted about the longitudinal axis of the apparatus in abutment with the solid distal portion of said holder and an outer jack mounted coaxially about said first jack and longitudinally projecting past said inner jack, said outer jack being in juxtaposition to the internal walls of said cored portion, the integral stop of said cored portion extending though the gap of said outer jack to form a mechanical stop in the annulus between said jacks, the gaps in said jacks being in radial alignment; and an expendable, tubular plug-in temperature sensing unit which mounts on said manipulator section, having a polarized contact plug at its distal end which mates with said contact block.

4. An expendable plug-in temperature sensing unit for use in a pyrometric lance apparatus comprising a body tube; a stepped contact plug capping the distal end of said body tube including a first central longitudinally distally projecting cored step which is circular in cross section, a first core plug within the core of said first step, a second offset cored step which projects distally less than said first step, and a second core plug within the core of said second step; a thermocouple mounted at the proximal end of said body tube; polarized lead wires connecting to said thermocouple and extending through said body tube and along the sides of said steps and down into their respective cores wherein they are secured by one of said core plugs, said wires being in transverse radial alignment, and a tubular shield within said body tube encompassing one of said lead wires.

5. A pyrometric lance apparatus comprising a manipulator section including a pipe section containing a pair of polarized lead wires extending longitudinally therethrough; a generally tubular longitudinally extending contact block holder, through which said lead wires extend, mounted on the proximal end of said pipe section including an external proximal offset adapted to abut the end of a protective sleeve and an internal proximal shoulder adapted to abut the distal end of a contact block and fix its longitudinal position; a generally cylindrical non-conductive contact block having a solid distal portion and a cored proximal portion releasably secured within said holder against its external proximal shoulder and effectively capping and terminating said manipulator section, said cored proximal portion including an integral inward projecting radial stop and having mounted within it two gapped coaxial split-ring jacks to which said lead wires are connected, said jacks comprising an inner jack mounted about the longitudinal axis of the apparatus in abutment with the solid distal portion of said holder and an outer jack mounted coaxially about said first jack and longitudinally projecting past said inner jack, said outer jack being in juxtaposition to the internal walls of said cored portion extending through the gap of said outer jack to form a mechanical stop in the annulus between said jacks, the gaps in said jacks being in radial alignment; and an expendable plug-in temperature sensing section including a body tube; a stepped contact plug capping the distal end of said body tube including a first central longitudinally distally projecting cored step which is circular in cross section, a first core plug within the core of said first step, a second offset cored step which projects distally less than said first step and is inscribed within the annulus between said first step and the perimeter of said contact plug, second core plug within the core of said second step and means for conducting lead wires from the interior of said body tube to the feet of said steps; a thermocouple mounted at the proximal end of said body tube; polarized lead wires connecting to said thermocouple and extending through said body tube to said contact plug; each of said wires passing through said contact plug, and longitudinally extending along the side of one of said steps and down into its core wherein it is secured by one of said core plugs, said wires being in transverse radial alignment; a tubular shield within said body tube encompassing one of said lead wires; means for protecting said junction; and a protective sleeve mounted on the distal end of said body tube and projecting beyond said contact plug; when said sensing section is mounted on said manipulator section, each of said steps is within said jacks making linear point contact therewith, and the distal end of said protective sleeve abuts the proximal offset of said contact block holder.

6. A pyrometric lance apparatus comprising a manipulator section including a pipe section containing a pair of polarized lead wires extending longitudinally therethrough; an external tube stop sleeve longitudinally positionable along and releasably mounted about said pipe section including an external distal tapered surface and an external proximal tapered surface, the transition between said surfaces defining a first proximal offset adapted to abut the end of a protective tube; a generally tubular longitudinally extending contact block holder, through which said lead wires extend, mounted on the proximal end of said pipe section including an external proximal offset adapted to abut the end of a protective sleeve and an internal proximal shoulder adapted to abut the distal end of a contact block and fix its longitudinal position; a generally cylindrical non-conductive contact block having a solid distal portion and a cored proximal portion releasably secured within said holder against its internal proximal shoulder and effectively capping and terminating said manipulator section, said cored proximal portion including and an integral inward projecting radial stop and having mounted within it two gapped co-axial split-ring jacks to which said lead wires are connected, said jacks comprising an inner jack mounted about the longitudinal axis of the apparatus in abutment with the solid distal portion of said holder and an outer jack mounted coaxially about said first jack and longitudinally projecting past said inner jack, said outer jack being in juxtaposition to the internal walls of said cored portion, the integral stop of said cored portion extending through the gap of said outer jack to form a mechanical stop in the annulus between said jacks, the gaps in said jacks being in radial alignment; and an expendable plug-in temperature sensing section lance apparatus including a body tube; a stepped contact plug capping the distal end of said body tube including a first central longitudinally distally projecting cored step which is circular in cross section, a first core plug within the core of said first step, a second offset cored step which projects distally less than said first step, and a second core plug within the core of said second step; a thermocouple mounted at the proximal end of said body tube; polarized lead wires connecting to said thermocouple and extending through said body tube and along the sides of said steps and down into their cores wherein they are secured by one of said core plugs, said wires being in transverse radial alignment; and a tubular shield within said body tube encompassing one of said lead wires; a protective sleeve mounted on the distal end of said body tube and projecting beyond said contact plug; and a protective tube telescopically mounted on said protective sleeve; when said sensing section is mounted on said manipulator section, each of said steps is within said jacks making linear point contact therewith, the distal end of said protective sleeve abuts the proximal offset of said contact block holder and said protective tube can be slid into abutment with said offset on said tube stop sleeve to expose said thermocouple.

No references cited.

WINSTON A. DOUGLAS, *Primary Examiner.*

ALLEN B. CURTIS, *Assistant Examiner.*